(12) United States Patent
Dotan

(10) Patent No.: US 8,701,174 B1
(45) Date of Patent: Apr. 15, 2014

(54) CONTROLLING ACCESS TO A PROTECTED RESOURCE USING A VIRTUAL DESKTOP AND ONGOING AUTHENTICATION

(75) Inventor: Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 121 days.

(21) Appl. No.: 13/246,023

(22) Filed: Sep. 27, 2011

(51) Int. Cl.
 *H04L 9/32* (2006.01)

(52) U.S. Cl.
 USPC .................. 726/9; 726/4; 726/7; 709/203

(58) Field of Classification Search
 None
 See application file for complete search history.

(56) References Cited

U.S. PATENT DOCUMENTS

| | | | |
|---|---|---|---|
| 7,739,197 B2 * | 6/2010 | Jambunathan et al. | ......... 705/65 |
| 8,095,966 B1 | 1/2012 | Carson, Jr. et al. | |
| 8,132,073 B1 | 3/2012 | Bowers et al. | |
| 8,156,516 B2 | 4/2012 | McClain et al. | |
| 8,176,336 B1 | 5/2012 | Mao et al. | |
| 8,195,153 B1 | 6/2012 | Frencel et al. | |
| 8,291,490 B1 | 10/2012 | Ahmed et al. | |
| 8,307,362 B1 | 11/2012 | Gong et al. | |
| 8,321,921 B1 | 11/2012 | Ahmed et al. | |
| 2003/0208697 A1 * | 11/2003 | Gardner | ......... 713/202 |
| 2008/0127323 A1 * | 5/2008 | Soin et al. | ......... 726/12 |
| 2010/0186072 A1 * | 7/2010 | Kumar | .............. 726/7 |
| 2012/0072898 A1 * | 3/2012 | Pappas et al. | ......... 717/171 |
| 2012/0089980 A1 * | 4/2012 | Sharp et al. | ......... 718/1 |
| 2012/0226742 A1 * | 9/2012 | Momchilov et al. | .......... 709/203 |

* cited by examiner

*Primary Examiner* — Jung Kim
*Assistant Examiner* — Janusz Kusyk
(74) *Attorney, Agent, or Firm* — BainwoodHuang

(57) ABSTRACT

A technique controls access to a protected resource. The technique involves performing a series of authentication operations between an end user device and an authentication engine, and providing, while the series of authentication operations results in ongoing successful authentication, a virtual desktop session from a virtual desktop server to the end user device to enable a user at the end user device to access the protected resource using the virtual desktop session. The technique further involves closing the virtual desktop session when the series of authentication operations results in unsuccessful authentication (e.g., receipt of an incorrect authentication factor, loss of communications between the end user device and the authentication engine, etc.) to prevent further access to the protected resource using the virtual desktop session. Such operation provides additional security beyond that offered by a virtual desktop session without ongoing authentication, and thus protects against more advanced types of cyber threats.

12 Claims, 5 Drawing Sheets

CONTROLLING ACCESS TO A PROTECTED RESOURCE USING A VIRTUAL DESKTOP AND ONGOING AUTHENTICATION

BACKGROUND

A conventional hardware security token is a portable device which provides one-time passcodes (OTPs) on behalf of a user. One type of security token displays OTPs in a display screen (e.g., an LCD). Another type of security token electronically outputs OTPs through a USB port.

When the user attempts to login into a computerized account, the user may be prompted to provide a username (or a user identifier) and two authentication factors. One authentication factor may be a password (i.e., something that the user knows), and the other authentication factor may be an OTP from the security token (i.e., something that the user has).

For example, suppose that the user wishes to use a computer to login to an online bank account to perform a banking transaction. The user may launch a browser application on the user's computer and navigate to the online bank's website using the browser application. During an authentication operation, the user may need to enter a username, a password and an OTP from the user's security token. If the security token has a display, the user may need to manually type in the OTP by hand. However, if the security token has a USB port, the user is able to simply plug the security token into a complementary USB port of the user's computer in order to provide the OTP.

SUMMARY

Unfortunately, there are deficiencies to the above-described conventional approach to accessing websites (e.g., logging into an online banking website) by running a browser application on the user's computer. In particular, in this approach, the user's computer is susceptible to malicious software (malware) which may be inadvertently acquired by the user's browser application. The malware installs itself on the user's computer and is then capable of recording user data (e.g., key loggers), or perhaps even taking control (e.g., a Man-in-The-Browser or MiTB).

One means of protecting the user's computer against such malware is to run a browser application on a virtual desktop, i.e., a virtualized environment which is hosted on a remote server. Here, the user runs a virtual machine client on the user's computer, and the virtual machine client establishes a virtual desktop session to a virtual desktop running on the remote server. The user is then able to indirectly access other websites (e.g., an online banking website) by running a browser application on the virtual desktop rather than on the user's computer. Accordingly, the user's computer is shielded from direct interaction with any malware, and the virtual desktop is destroyed once the virtual machine client ends the virtual desktop session.

However, even remotely running a browser application on a virtual desktop from the user's computer may leave certain vulnerability points open for a cyber attacker. For example, the cyber attacker may have obtained a clone of the user's virtual machine client and thus possess the ability to initiate a virtual desktop session or perhaps even infiltrate an existing virtual desktop session (e.g., the online banking website), posing as the user. Such lurking cyber threats (e.g., an advanced persistent threat or APT) may succeed due to a lack of ongoing (or continuing) authentication with the user and/or the user's computer.

In contrast to conventional virtual desktop approaches which lack ongoing authentication, improved techniques control access to a protected resource (e.g., an online banking website) by performing a series of authentication operations between an end user device and an authentication engine during a virtual desktop session. The end user device and the authentication engine allow the virtual desktop session to continue as long as results of the series of authentication operations are successful. However, once the series of authentication operations results in unsuccessful authentication, the end user device and/or the authentication engine closes the virtual desktop session to prevent further access to the protected resource via the virtual desktop session. Such operation provides additional security above and beyond that offered by a virtual desktop session without ongoing authentication, and thus protects against more advanced cyber threats.

One embodiment is directed to a method of controlling access to a protected resource. The method includes performing a series of authentication operations between an end user device and an authentication engine, and providing, while the series of authentication operations results in ongoing successful authentication, a virtual desktop session from a virtual desktop server to the end user device to enable a user at the end user device to access the protected resource using the virtual desktop session. The method further includes closing the virtual desktop session when the series of authentication operations results in unsuccessful authentication to prevent further access to the protected resource using the virtual desktop session.

In some arrangements, the series of authentication operations results in ongoing successful authentication as long as each authentication operation individually results in successful authentication before a timeout clock elapses. During such ongoing successful authentication, the authentication engine and the end user device refrain from terminating the virtual desktop session. However, if authentication is unsuccessful (e.g., due to a passcode mismatch, due to a timeout, etc.), the virtual desktop is terminated by the authentication engine and/or the end user device to protect against unsecure access of the protected resource using the virtual desktop session.

Other embodiments are directed to apparatus, electronic token devices, computer program products, and so on. Some embodiments are directed to various processes, electronic components and circuits which are involved in controlling access to a protected resource.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique controls access to a protected resource (e.g., an online banking website) by performing a series of authentication operations between an end user device and an authentication engine during a virtual desktop session. The end user device and the authentication engine allow the virtual desktop session to continue as long as results of the series of authentication operations are successful. However, once the series of authentication operations results in unsuccessful authentication (e.g., due to receipt of an incorrect authentication factor, due to loss of communications between the end user device and the authentication engine, etc.), the end user device and/or the authentication engine terminates the virtual desktop session to prevent further access to the protected resource via the virtual desktop session. Such operation provides additional security above and beyond that offered by a virtual desktop session which lacks ongoing authentication, and thus protects against more advanced cyber threats such as hijacking of an existing virtual desktop session.

Figure 1:
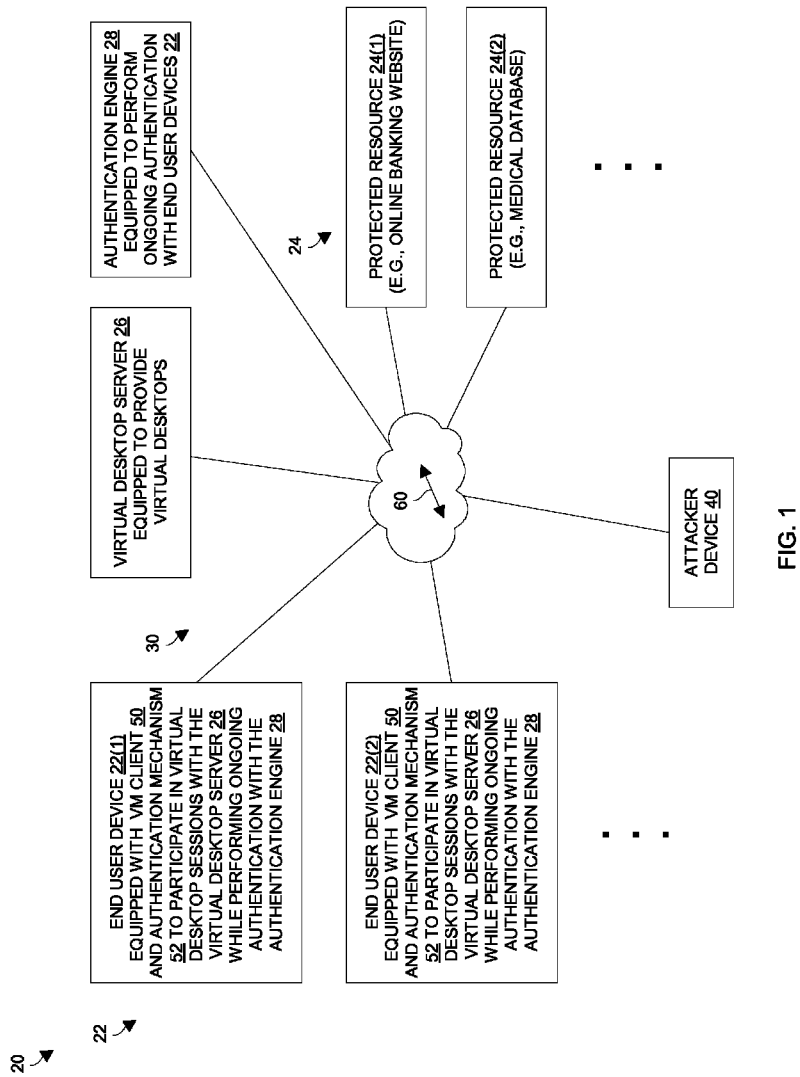
FIG. 1 is a block diagram of an electronic environment which enables end user devices to access protected resources with ongoing authentication.

FIG. 1 shows an electronic environment 20 which enables end user devices to access protected resources using ongoing authentication. As shown, the electronic environment 20 includes end user devices 22(1), 22(2), ... (collectively, end user devices 22), protected resources 24(1), 24(2), ... (collectively, protective resources 24), a virtual desktop server 26, an authentication engine 28 and a communications medium 30. The electronic environment 20 may also include malicious equipment such as an attacker device 40.

The end user devices 22 are constructed and arranged to operate on behalf of users. Examples of suitable end user devices 22 include appropriately configured or provisioned general purpose computers, user workstations, laptops, and other smart portable devices. Each end user device 22 is capable of communicating with various other entities of the electronic environment 20 to perform useful work. In particular, each end user device 22 is equipped with (i) a virtual machine (VM) client 50 in order to participate in virtual desktop sessions with the virtual desktop server 26 to access the protected resources 24 and (ii) an authentication mechanism 52 to perform authentication operations with the authentication engine 28. As will be explained in further detail shortly, the authentication mechanism 52 includes (i) a token (e.g., a soft token, a hardware token, etc.) in order to authenticate with the authentication engine 28 and (ii) authentication server circuitry to authenticate the authentication engine 28, i.e., for bidirectional authentication.

The protected resources 24 are security sensitive apparatus which can be accessed remotely. Examples of protected resources 24 include an online banking website that allows users to perform online banking transactions, a medical database which allows users to access patient medical records, and various other remote systems, application servers, web servers, and/or network appliances that users of the end user devices 22 may wish to reach under secure conditions.

The virtual desktop server 26 is a virtual machine platform which hosts virtual desktops for use by users of the end user devices 22. Each virtual desktop operates as a secure interface through which a user of an end user device 22 is capable of accessing a protected resource 24.

The authentication engine 28 is constructed and arranged to perform authentication operations with the end user devices 22. Additionally, the authentication engine 28 is constructed and arranged to communicate with the virtual desktop server 26 to control creation and termination of virtual desktops on the virtual desktop server 26.

The communications medium 30 connects the various electronic devices of the electronic environment 20 together to enable the electronic devices to exchange electronic signals 60 (e.g., see the double arrow 60). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based devices and cabling, fiber optic devices and cabling, wireless devices, combinations thereof, etc.

During operation, users operate the end user devices 22 to access the protected resources 24. In particular, the users begin respective series of authentication operations with the authentication engine 28, and participate in virtual desktop sessions provided by the virtual desktop server 26 to access the protected resources 24 through virtual desktops running on the virtual desktop server 26. The virtual desktop sessions protect the end user devices 22 against inadvertent downloading and installation of malware on the end user devices 22. Additionally, the respective series of authentication operations between the end user devices 22 and the authentication engine 28, which transparently run in the background, protect against advanced cyber threats such as advanced persistent threats (ATPs) which could otherwise infiltrate the virtual desktop sessions after initial successful authentication. The attacker device 40 is intended to illustrate the continuous threat of a cyber attack within the electronic environment 20. Further details will now provided with reference to FIG. 2.

Figure 2:
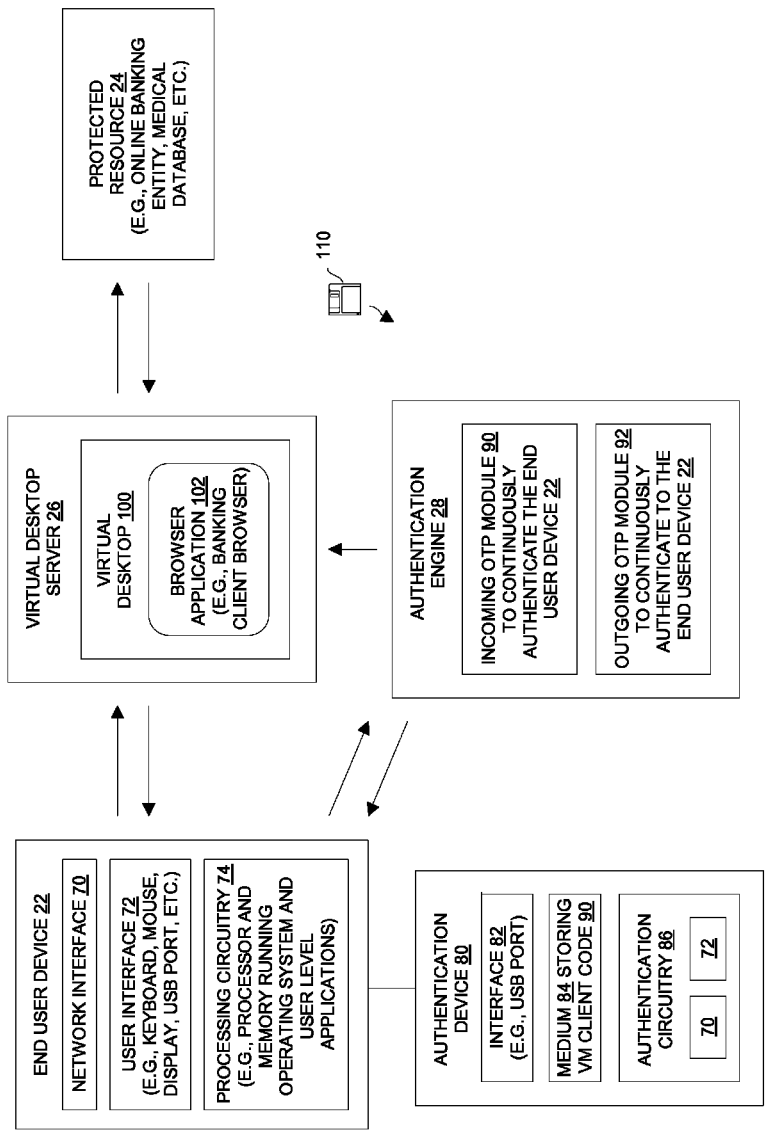
FIG. 2 is a block diagram of particular devices of the electronic environment of FIG. 1 during operation.

FIG. 2 shows particular details of various devices of the electronic environment 20 which are involved in providing a user of an end user device 22 with access to a protected resource 24. As shown, the end user device 22 includes a network interface 70, a user interface 72, and processing circuitry 74.

The network interface 70 connects the end user device 22 to the communications medium 30 (FIG. 1) and thus enables the end user device 22 to communicate with other devices of the electronic environment 20. In some arrangements, the network interface 70 is implemented in the form of a network card or a network adapter module.

The user interface 72 of the end user device 22 receives input from the user and provides output to the user. To this end, the user interface 52 may include a keyboard, a mouse, and a display. The user interface 72 also includes ports (e.g., a USB port, etc.) which enable the user to connect peripheral devices to the end user device 22.

The processing circuitry 74 of the end user device 22 enables the end user device 22 to perform useful work (e.g., perform online banking transactions with an online banking website). In some arrangements, the processing circuitry 74 includes a processor and memory to run an operating system and user level applications.

Attached to the end user device 22 is a removable authentication device 80 which includes an interface 82, a non-transitory computer readable medium 84, and an authentication module 86.

The interface 82 allows the authentication device 80 to connect with the end user device 22 and disconnect from the end user device 22. In some arrangements, the interface 82 includes a USB port which can engage a complementary USB port of the end user device 22 (e.g., see the user interface 72).

The non-transitory computer readable medium 84 stores virtual machine client code 90 which runs on (or perhaps even installs onto) the end user device 22. When the virtual machine client code 90 runs on the processing circuitry 74, the processing circuitry 74 forms the VM client 50 (also see FIG. 1) which is capable of creating and maintaining a virtual desktop session with the virtual desktop server 26 to access a protected resource 24.

The authentication circuitry 86 of the authentication device 80 includes a token circuit 70 which generates user tokens (e.g., one-time passcodes or OTPs) based on a user seed (or secret). When the authentication device 80 attaches to the end user device 22, such user tokens can be provided to the authentication engine 28 to authenticate the user and the end user device 22 to the authentication engine 28. Along these lines, the authentication engine 28 has a copy of the user seed and locally generates expected user tokens which must match with the tokens received from the end user device 22. If the actual user tokens continue to match the expected user tokens, authentication is deemed successful. However, if the authentication engine 28 discovers a mismatch between an actual user token and an expected user token, authentication is deemed to have failed.

The authentication circuitry 86 of the authentication device 80 further includes authentication server circuitry 72 which compares authentication engine tokens (e.g., OTPs) received from the authentication engine 28 with locally generated expected authentication engine tokens for bidirectional authentication. In particular, the authentication engine 28 generates authentication engine tokens from an authentication engine seed and these tokens which are provided to the authentication circuitry 86 through the end user device 22. The authentication circuitry 86 locally generates expected authentication engine tokens from a copy of the authentication engine seed, and determines whether the actual authentication engine tokens match the locally generated expected authentication engine tokens. If the actual authentication engine tokens continue to match the expected authentication engine tokens, authentication is deemed successful. However, if there is a mismatch between an actual authentication engine token and an expected authentication engine token, authentication is deemed to have failed.

As further shown in FIG. 2, the authentication engine 28 includes an incoming token module 90 and an outgoing token module 92. The incoming token module 90 locally generates expected user tokens based on the user seed, and compares the locally generated expected user tokens to actual user tokens received from the authentication device 80. The outgoing token module 92 generates authentication engine tokens based on the authentication engine seed and provides the authentication engine tokens to the authentication device 80 attached to the end user device 22 to authenticate the authentication engine 28 with the authentication device 80.

The virtual desktop server 26 is constructed and arranged to provide a virtual desktop 100 for use by the end user device 22 during a virtual desktop session. While the virtual desktop 100 is running, the user is able to communicate with the protected resource 24 through the virtual desktop 100. For example, the user is able to run a browser application 102 within the virtual desktop 100. The browser application 102 may be a standard browser (e.g., native to a particular operating system) or a custom browser (e.g., a graphical user interface which is specific to the particular protected resource 24).

Along these lines, suppose that the user of the end user device 22 wishes to create a virtual desktop session with the virtual desktop server 26 to access the protected resource 24. The user attaches the authentication device 80 to the end user device 22 (e.g., the user plugs a USB port of the authentication device 80 into a complementary USB port of the end user device 22). The user then activates the VM client 50 on the end user device 22 (FIG. 1) which submits a session request to the protected resource 24. In response, the protected resource 24 directs the authentication engine 28 to authenticate the user.

If authentication is initially successful, the authentication engine 28 provides permission to the virtual desktop server 26 to create a virtual desktop 100 and a virtual desktop session with the end user device 22. Upon such creation, the user is now able to access the protected resource 24 through the virtual desktop 100, e.g., see the browser application 102 in FIG. 2. Such operation protects the end user devices 22 from malware since the end user devices 22 do not receive any code. Rather, the end user devices 22 are simply provided with virtual desktop session windows (e.g., bitmap images) of the virtual desktop 100 running on the virtual desktop server 26.

During the lifetime of the virtual desktop session, the end user device 22 is required to continuously authenticate with the authentication engine 28 in the background (e.g., within 1-5 minutes, every 2 minutes, every 3 minutes, etc.). If the authentication engine 28 does not properly authenticate the end user device 22 (e.g., due to a token mismatch, due to loss of communication with the end user device 22), the authentication engine 28 terminates the virtual desktop 100 to the end user device 22 to protect against more advanced types of cyber attacks.

Similarly, the authentication engine 28 is required to continuously authenticate with the end user device 22 in the background (e.g., within 1-5 minutes, every 2 minutes, every 3 minutes, etc.). If the end user device 22 does not properly authenticate the authentication engine 28 (e.g., due to a token mismatch, due to loss of communication with the authentication engine 28), the end user device 22 closes the virtual desktop session which effectively terminates the virtual desktop 100 again to protect against more advanced types of cyber attacks.

It should be understood that the various authentication components such as the authentication circuitry 86 of the authentication device 80, the module 90 and the module 92 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 110 is capable of delivering all or portions of the software to these components. The computer program product 110 has a non-transitory (or non-volatile) computer readable medium which stores a set of instructions which controls one or more operations of the components. Examples of suitable computer readable storage media include tangible articles of manufacture and apparatus which store instructions in a non-volatile manner such as CD-ROM, flash memory, disk memory, tape memory, and the like. Further details will now be provided with reference to FIGS. 3 and 4.

Figure 3:
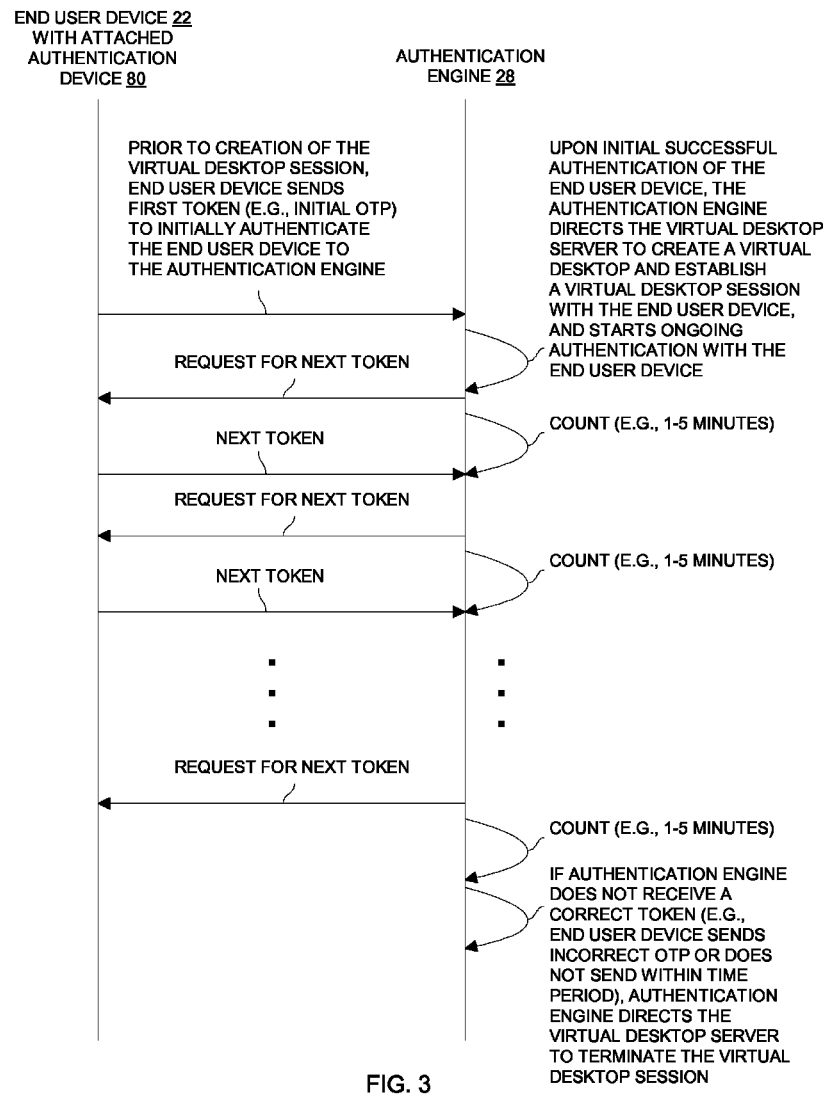
FIG. 3 is a sequence diagram illustrating particular operation when an authentication engine fails to properly authenticate an end user computer.
Figure 4:
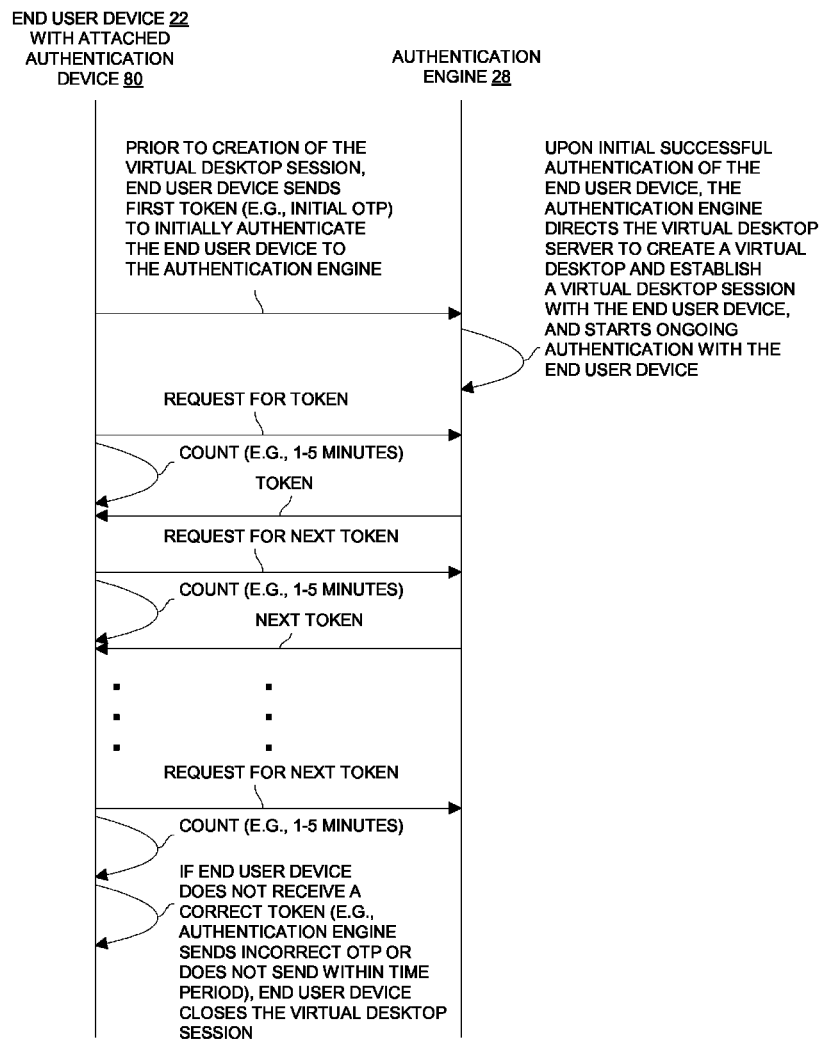
FIG. 4 is a sequence diagram illustrating particular operation when an end user computer fails to properly authenticate an authentication engine.

FIGS. 3 and 4 show sequence diagrams illustrating activity between the end user device 22 and the authentication engine 28 when the end user device 22 accesses a protected resource 24 through a virtual desktop session 100 the virtual desktop server 26 (also see FIG. 2). FIG. 3 shows a sequence diagram including activity when the authentication engine 28 eventually fails to successfully authenticate the end user device 22. FIG. 4 shows a sequence diagram including activity when the end user device 22 eventually fails to successfully authenticate the authentication engine 28.

As shown in FIG. 3, the end user device 22 provides a first token to the authentication engine 28. As explained earlier, the first token is an OTP generated by the authentication device 80 attached to the end user device 22 (FIG. 2). Upon initial successful authentication of the end user device 22, the authentication engine 28 provides a create command (or similar instruction/message) to the desktop server 26 directing the virtual desktop server 26 to create a virtual desktop 100 and a virtual desktop session with the end user device 22 (FIG. 2).

From this point forward, the authentication engine 28 attempts to successfully authenticate the end user device 22 in an ongoing manner by periodically requesting a new token from the end user device 22 (e.g., every 1-5 minutes). That is, the authentication engine 28 sends a request for another token to the end user device 22. The authentication engine 28 then starts a timer (e.g., counts). The authentication engine 28 must receive a correct token back from the end user device 22 before the timer expires. If the authentication engine 28 receives a correct token back from the end user device 22 before the timer (e.g., a timeout clock) expires, the authentication engine 28 sends another request for another token, and so on. During this activity, the authentication engine 28 refrains from directing the virtual desktop server 26 to terminate the virtual desktop 100 while the authentication operations result in ongoing successful authentication. Accordingly, the user of the end user device 22 is able to continue to access the protected resource 24 using the virtual desktop 100.

However, as shown at the bottom of FIG. 3, if the authentication engine 28 does not receive the correct token back from the end user device 22 before the timer expires (e.g., the received token does not match an expected token, the end user device 22 does not send a token before a timeout clock elapses, communication is lost, etc.), the authentication engine 28 provides a close command which directs the virtual desktop server 26 to terminate the virtual desktop 100. As a result, if the virtual desktop session had been compromised (e.g., hijacked or otherwise infiltrated by a cyber attack), the virtual desktop 100 is no longer available to provide further access to the protected resource 24.

As shown in FIG. 4, after the end user device 22 has properly authenticated itself to the authentication engine 28 and the authentication engine 28 responds by instructing the virtual desktop server 26 to provide a virtual desktop session, the end user device 22 attempts to successfully authenticate the authentication engine 28 in an ongoing manner by periodically requesting a new token from the authentication engine 28 (e.g., every 1-5 minutes). In particular, the end user device 22 sends a request for a token to the authentication engine 28. The end user device 22 then starts a timer (e.g., counts). The end user device 22 must receive a correct token back from the authentication engine 28 before the timer expires. If the end user device 22 receives a token back from the authentication engine 28 before the timer expires, the end user device 22 compares the received token with a locally generated token (see the authentication device 80 in FIG. 2). If there is a proper match, the authentication engine 28 has successfully authenticated with the end user device 22, and the end user device 22 sends another request for another token from the authentication engine 28, and so on. During this activity, the end user device 22 maintains the virtual desktop session with the virtual desktop server 26 thus enabling the user of the end user device 22 to access the protected resource 24 using the virtual desktop 100.

However, as shown at the bottom of FIG. 4, if the end user device 22 does not receive the correct token back from the authentication engine 28 before the timer expires (e.g., the received token does not match an expected token, the authentication engine 28 does not send a token, communication is lost, etc.), the end user device 22 closes the virtual desktop session with the virtual desktop server 26 thus terminating the virtual desktop 100. As a result, if the system has somehow been infiltrated (e.g., the authentication engine 28 has been compromised), the virtual desktop 100 is no longer available to provide further access to the protected resource 24.

At this point, it should be understood that the pace of authentication operations during continuous authentication can be controlled in a number of ways. For example, after the authentication engine 28 successfully authenticates the end user device 22, the authentication engine 28 can wait a predefined amount of time (e.g., 1 minute) before sending a request for a next token to the end user device 22. Similarly, after the end user device 22 successfully authenticates the authentication engine 28, the end user device 22 can wait a predefined amount of time (e.g., 1 minute) before sending a request for a next token to the authentication engine 28.

As alternative, when the authentication engine 28 sends a request for a next token to the end user device 22, the authentication engine 28 can combine that request with delivery of a token that it has generated. Accordingly, when the end user device 22 receives the request for the next token, the end user device 22 also treats that communication as the delivery of the token from the authentication engine 28 and performs an authentication operation to authenticate the authentication engine 28. Similarly, when the end user device 22 sends a request for a next token to the authentication engine 28, the end user device 22 can combine that request with delivery of a token that the end user device 22 has generated. As a result, when the authentication engine 22 receives the request for the next token, the authentication engine 28 also treats that communication as the delivery of the token from the end user device 22 and performs an authentication operation to authenticate the end user device 22. In this alternative, each device can wait a predefined amount of time (e.g., 1 minute) before generating a token and sending the combination request and token to the other device.

Other arrangements for controlling the frequency of each authentication operation in the series of authentication operations are suitable for use as well. Further details will now be provided with reference to FIG. 5.

Figure 5:
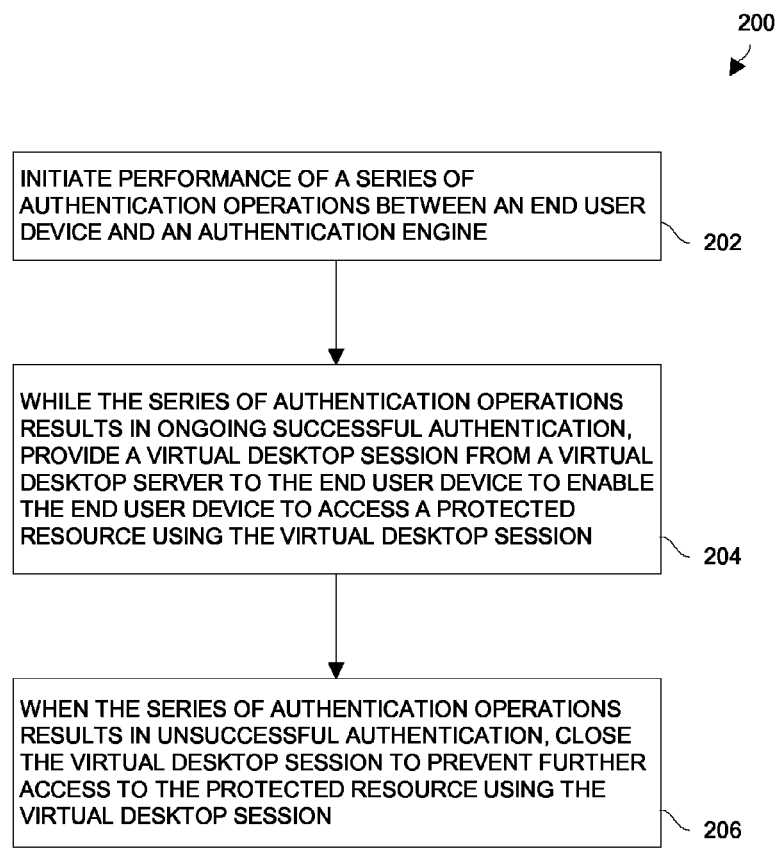
FIG. 5 is a flowchart of a procedure which is performed during operation.

FIG. 5 is a flowchart of a procedure 200 which is performed during operation of the electronic environment 20 of FIG. 1. In step 202, the end user device 22 and the authentication engine 28 initiate performance of a series of authentication operations to accomplish bidirectional authentication. In particular, the end user device 22 provides the authentication engine 28 with a series of actual user tokens (e.g., OTPs) which the authentication engine 28 matches to a series of expected user tokens. Additionally, the authentication engine 28 provides the end user device 22 with a series of actual authentication engine tokens which the end user device 22 matches to a series of expected authentication engine tokens. In some arrangements, the user tokens and authentication engine tokens are derived from a common seed. In other arrangements, the user tokens and authentication engine tokens are derived from different seeds.

In step 204, while the series of authentication operations results in ongoing successful authentication, the authentication engine 28 directs the virtual desktop server 26 to provide a virtual desktop session to the end user device 22 to enable the user of the end user device 22 to access the protected resource 24 using the virtual desktop session. If the series of authentication operations results in ongoing successful authentication throughout the virtual desktop session, the virtual desktop is finally terminated when the user closes the virtual desktop session.

In step 206, when the series of authentication operations results in unsuccessful authentication (e.g., the user has not purposefully closed the virtual desktop session), the end user device 22 and/or the authentication engine 28 terminates the virtual desktop session to prevent further access to the protected resource 24 using the virtual desktop session. As shown in FIGS. 3 and 4, both the end user device 22 and the authentication engine 28 have the ability to terminate the virtual desktop session.

As described above, improved techniques control access to a protected resource 24 (e.g., an online banking website) by performing a series of authentication operations between an end user device 22 and an authentication engine 28 during a virtual desktop session. The end user device 22 and the authentication engine 28 allow the virtual desktop session to continue as long as results of the series of authentication operations are successful. However, once the series of authentication operations results in unsuccessful authentication, the end user device 22 and/or the authentication engine 28 terminates the virtual desktop session to prevent further access to the protected resource via the virtual desktop session. Such operation provides additional security above and beyond that offered by a virtual desktop session without ongoing authentication, and thus protects against more advanced cyber threats.

While various embodiments of the invention have been particularly shown and described, it will be understood by those skilled in the art that various changes in form and details may be made therein without departing from the spirit and scope of the invention as defined by the appended claims.

For example, it should be understood that the authentication device 80 (FIG. 2) is something that the user possesses, and can be detached from the end user device 22 (e.g., the end user device 22(1) in FIG. 1) and attached to another end user device 22 (e.g., the end user device 22(2) in FIG. 1). Accordingly, the authentication device 80 provides the user with the ability to perform multi-factor authentication from different end user devices 22. Furthermore, since the authentication device 80 is equipped with VM client code 90 for the VM client 50, the user is able to conveniently access the protected resources 24 by simply attaching the authentication device 80 to an end user device 22 and running the VM client code 90 on that device 22.

Additionally, it should be understood that alternative forms of deployment are available to create the VM client 50 and the authentication mechanism 52 on an end user device 22. For example, the VM client code 90 and the code for the authentication mechanism 52 can be installed from any non-transitory computer readable medium, from a network download or network kit, from an initial setup session with the protected resource 24, etc.

Furthermore, it was described above by way of example only that one unsuccessful authentication operation resulted in immediate termination of a virtual desktop 100. In other arrangements, the operation of the various devices is more forgiving. For example, in some arrangements, an authentication operation resulting unsuccessful authentication triggers a challenge to the user; the virtual desktop 100 continues only if the user properly answers the challenge. As another example, in some arrangements, the virtual desktop 100 continues unless a predefined number of unsuccessful authentications occur in a row (e.g., 2-5 token mismatches in a row). As yet another example, if either the end user device 22 or the authentication engine 28 does not receive a token during the predefined amount of time, that device is configured to resend a token request a predefined number of times in hope of obtaining successful authentication before terminating the virtual desktop 100.

What is claimed is:

1. A method of controlling access to a protected resource, the method comprising:
   performing a continuous series of authentication operations between an end user device and an authentication engine;
   while the continuous series of authentication operations results in ongoing successful authentication, providing a virtual desktop session from a virtual desktop server to the end user device to enable a user at the end user device to access the protected resource using the virtual desktop session; and
   when the continuous series of authentication operations results in unsuccessful authentication, closing the virtual desktop session to prevent further access to the protected resource using the virtual desktop session;
   wherein the protected resource is a website;
   wherein providing the virtual desktop session from the virtual desktop server to the end user device to enable the user at the end user device to access the protected resource using the virtual desktop session includes supplying the virtual desktop session from the virtual desktop server to the end user device while the user runs, within the virtual desktop session, a browser application to access the website;
   wherein the browser runs in a virtual desktop server which is remote with respect to the end user device;
   wherein the website runs in a web server which is remote with respect to the end user device, the virtual desktop server and the web server residing at different physical locations;
   wherein supplying the virtual desktop session while the user runs, within the virtual desktop session, the browser application to access the website includes making the virtual desktop session available to the end user device while the user authenticates with the website running in the web server in a manner which is independent of the continuous series of authentication operations resulting in successful authentication between the end user device and the authentication engine;
   wherein performing the continuous series of authentication operations between the end user device and the authentication engine includes authenticating the end user device to the authentication engine, and authenticating the authentication engine to the end user device;
   wherein authenticating the end user device to the authentication engine includes evaluating, at the authentication engine, an end user device token code received from the end user device through a network;
   wherein the end user device token code is an end user device one-time passcode derived from a seed stored at the end user device; and
   wherein evaluating the end user device token code received from the end user device through the network includes comparing the end user device one-time passcode to an expected one-time passcode derived from a copy of the seed stored at the authentication engine;

further including issuing a one-time passcode hardware device to the user for installation on the end user device, the one-time passcode hardware device being the source of the end user device one-time passcode; and wherein the end user device includes a virtual machine client which resides at a first location, the virtual desktop server resides at a second location which is separate from the first location, the protected resource resides at a third location which is separate from the first and second locations; and wherein providing the virtual desktop session from the virtual desktop server to the end user device while the continuous series of authentication operations results in ongoing successful authentication includes:

creating a virtual machine on the virtual desktop server, providing user access to the virtual machine created on the virtual desktop server through the virtual machine client of the end user device to enable a user to operate the virtual machine remotely from the virtual machine client of the end user device, the user accessing the protected resource at the third location via the virtual machine created on the virtual desktop server at the second location from the virtual machine client of the end user device residing at the first location.

2. A method as in claim 1 wherein authenticating the authentication engine to the end user device includes:

providing an authentication engine token code from the authentication engine to the end user device, the authentication engine token code being different than the end user device token code.

3. A method as in claim 2 wherein providing the authentication engine token code from the authentication engine to the end user device includes:

deriving, as the authentication engine token code, an authentication engine one-time passcode from a seed stored at the authentication engine, and sending the authentication engine one-time passcode to the end user device through the network for comparison with an expected one-time passcode derived from a copy of the seed stored at the end user device.

4. A method as in claim 1 wherein providing the virtual desktop session from the virtual desktop server to the end user device to enable the user at the end user device to access the protected resource using the virtual desktop session includes:

providing a create command from the authentication engine to the virtual desktop server directing the virtual desktop server to create the virtual desktop session for use by the end user device.

5. A method as in claim 4 wherein closing the virtual desktop session to prevent further access to the protected resource using the virtual desktop session includes:

in response to detection that the continuous series of authentication operations results in unsuccessful authentication, providing a close command from the authentication engine to the virtual desktop server directing the virtual desktop server to close the virtual desktop session.

6. A method as in claim 5 wherein providing the virtual desktop session from the virtual desktop server to the end user device to enable the user at the end user device to access the protected resource using the virtual desktop session further includes:

refraining from sending the close command from the authentication engine to the virtual desktop server as long as the authentication engine routinely performs a new successful authentication operation to authenticate the end user device before a timeout clock elapses.

7. A method as in claim 1 wherein providing the virtual desktop session from the virtual desktop server to the end user device to enable the user at the end user device to access the protected resource using the virtual desktop session includes:

providing a create command from the authentication engine to the virtual desktop server rendering, on the end user device, a virtual desktop window from the virtual desktop server.

8. A method as in claim 7 wherein closing the virtual desktop session to prevent further access to the protected resource using the virtual desktop session includes:

in response to detection that the continuous series of authentication operations results in unsuccessful authentication, closing the virtual desktop window rendered from the virtual desktop server.

9. A method as in claim 8 wherein providing the virtual desktop session from the virtual desktop server to the end user device to enable the user at the end user device to access the protected resource using the virtual desktop session further includes:

refraining from closing the virtual desktop window rendered from the virtual desktop server as long as the end user device routinely performs a new successful authentication operation to authenticate the authentication engine before a timeout clock elapses.

10. An apparatus to control access to a protected resource, the apparatus comprising:

a network interface to couple to a network; and processing circuitry coupled to the network interface, the processing circuitry being constructed and arranged to:

perform a continuous series of authentication operations to authenticate an end user device through the network interface, while the continuous series of authentication operations results in ongoing successful authentication, provide a virtual desktop session from a virtual desktop server to the end user device to enable a user at the end user device to access the protected resource using the virtual desktop session, and when the continuous series of authentication operations results in unsuccessful authentication, close the virtual desktop session to prevent further access to the protected resource using the virtual desktop session;

wherein the protected resource is a website;

wherein the processing circuitry, when providing the virtual desktop session from the virtual desktop server to the end user device to enable the user at the end user device to access the protected resource using the virtual desktop session is constructed and arranged to supply the virtual desktop session from the virtual desktop server to the end user device while the user runs, within the virtual desktop session, a browser application to access the website;

wherein the browser runs in a virtual desktop server which is remote with respect to the end user device;

wherein the website runs in a web server which is remote with respect to the end user device, the virtual desktop server and the web server residing at different physical locations;

wherein the processing circuitry, when supplying the virtual desktop session while the user runs, within the virtual desktop session, the browser application to access the website is constructed and arranged to make the virtual desktop session available to the end user device while the user authenticates with the website running in the web server in a manner which is independent of the continuous series of authentication operations resulting in successful authentication between the end user device and the authentication engine;

wherein the processing circuitry, when performing the continuous series of authentication operations between the end user device and the authentication engine is constructed and arranged to authenticate the end user device to the authentication engine, and authenticate the authentication engine to the end user device;

wherein authenticating the end user device to the authentication engine includes evaluating, at the authentication engine, an end user device token code received from the end user device through a network;

wherein the end user device token code is an end user device onetime passcode derived from a seed stored at the end user device; and wherein the processing circuitry, when evaluating the end user device token code received from the end user device through the network is constructed and arranged to compare the end user device one-time passcode to an expected one-time passcode derived from a copy of the seed stored at the authentication engine;

further including issuing a one-time passcode hardware device to the user for installation on the end user device, the one-time passcode hardware device being the source of the end user device one-time passcode; and wherein the end user device includes a virtual machine client which resides at a first location, the virtual desktop server resides at a second location which is separate from the first location, the protected resource resides at a third location which is separate from the first and second locations; and wherein the processing circuitry, when providing the virtual desktop session from the virtual desktop server to the end user device while the continuous series of authentication operations results in ongoing successful authentication is constructed and arranged to:

create a virtual machine on the virtual desktop server, provide user access to the virtual machine created on the virtual desktop server through the virtual machine client of the end user device to enable a user to operate the virtual machine remotely from the virtual machine client of the end user device, the user accessing the protected resource at the third location via the virtual machine created on the virtual desktop server at the second location from the virtual machine client of the end user device residing at the first location.

11. A computer program product having a non-transitory computer readable medium storing a set of instructions which, when performed by a computerized device, cause the computerized device to:

perform a continuous series of authentication operations to authenticate an end user device;

while the continuous series of authentication operations results in ongoing successful authentication, provide a virtual desktop session from a virtual desktop server to the end user device to enable a user at the end user device to access a protected resource using the virtual desktop session; and when the continuous series of authentication operations results in unsuccessful authentication, close the virtual desktop session to prevent further access to the protected resource using the virtual desktop session;

wherein the protected resource is a website;

wherein the virtual desktop session from the virtual desktop server to the end user device to enable the user at the end user device to access the protected resource using the virtual desktop session includes a browser application to access the website;

wherein the browser runs in a virtual desktop server which is remote with respect to the end user device;

wherein the website runs in a web server which is remote with respect to the end user device, the virtual desktop server and the web server residing at different physical locations;

wherein the virtual desktop session includes user authentication operations with the website running in the web server independent of the continuous series of authentication operations resulting in successful authentication between the end user device and the authentication engine;

wherein the continuous series of authentication operations between the end user device and the authentication engine includes authenticating the end user device to the authentication engine, and authenticating the authentication engine to the end user device;

wherein authenticating the end user device to the authentication engine includes evaluating an end user device token code received from the end user device through a network;

wherein the end user device token code is an end user device one-time passcode derived from a seed stored at the end user device; and wherein evaluating the end user device token code received from the end user device through the network includes comparing the end user device one-time passcode to an expected one-time passcode derived from a copy of the seed stored at the authentication engine;

further including a one-time passcode hardware device attached to the end user device, the one-time passcode hardware device being the source of the end user device one-time passcode; and wherein the end user device includes a virtual machine client which resides at a first location, the virtual desktop server resides at a second location which is separate from the first location, the protected resource resides at a third location which is separate from the first and second locations; and wherein providing the virtual desktop session from the virtual desktop server to the end user device includes a virtual machine on the virtual desktop server, and the user accessing the protected resource at the third location via the virtual machine residing on the virtual desktop server at the second location from the virtual machine client of the end user device residing at the first location.

12. An electronic authentication device to control access to a protected resource, the electronic authentication device comprising:

an interface to couple to an end user device; and a controller coupled to the interface, the controller being constructed and arranged to:

perform a continuous series of authentication operations to authenticate the end user device to an authentication engine, while the continuous series of authentication operations results in ongoing successful authentication, provide permission to the end user device through the interface to open a virtual desktop session with a virtual desktop server to enable a user at the end user device to access a the protected resource using the virtual desktop session, and when the continuous series of authentication operations results in unsuccessful authentication, deny permission to the end user device through the interface to force the end user device to close the virtual desktop session to prevent further access to the protected resource using the virtual desktop session;

wherein the protected resource is a website;

wherein the virtual desktop session from the virtual desktop server to the end user device to enable the user at the end user device to access the protected resource using the virtual desktop session includes a browser application to access the website;

wherein the browser runs in a virtual desktop server which is remote with respect to the end user device;

wherein the website runs in a web server which is remote with respect to the end user device, the virtual desktop server and the web server residing at different physical locations;

wherein the virtual desktop session includes user authentication operations with the website running in the web server independent of the continuous series of authentication operations resulting in successful authentication between the end user device and the authentication engine;

wherein the continuous series of authentication operations between the end user device and the authentication engine includes authenticating the end user device to the authentication engine, and authenticating the authentication engine to the end user device;

wherein the controller, when authenticating the end user device to the authentication engine is constructed and arranged to evaluate an end user device token code received from the end user device through a network;

wherein the end user device token code is an end user device one-time passcode derived from a seed stored at the end user device; and wherein evaluating the end user device token code received from the end user device through the network includes comparing the end user device one-time passcode to an expected one-time passcode derived from a copy of the seed stored at the authentication engine;

further including a one-time passcode hardware device attached to the end user device, the one-time passcode hardware device being the source of the end user device one-time passcode; and wherein the end user device includes a virtual machine client which resides at a first location, the virtual desktop server resides at a second location which is separate from the first location, the protected resource resides at a third location which is separate from the first and second locations; and wherein the controller, when providing the virtual desktop session from the virtual desktop server to the end user device is constructed and arranged to provide a virtual machine on the virtual desktop server, and the user accessing the protected resource at the third location via the virtual machine residing on the virtual desktop server at the second location from the virtual machine client of the end user device residing at the first location.

* * * * *